(12) United States Patent
Miyagawa

(10) Patent No.: US 8,154,665 B2
(45) Date of Patent: Apr. 10, 2012

(54) BROADCAST RECEIVER

(75) Inventor: Tatsuo Miyagawa, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1239 days.

(21) Appl. No.: 11/690,928

(22) Filed: Mar. 26, 2007

(65) Prior Publication Data

US 2007/0242166 A1 Oct. 18, 2007

(30) Foreign Application Priority Data

Mar. 27, 2006 (JP) ................................ 2006-085758

(51) Int. Cl.
*H04N 5/50* (2006.01)
(52) U.S. Cl. ........ 348/732; 348/555; 348/558; 348/570; 725/38; 725/59; 725/9
(58) Field of Classification Search .................... 725/38; 342/55; 315/382.1
See application file for complete search history.

(56) References Cited

U.S. PATENT DOCUMENTS

| | | | |
|---|---|---|---|
| 5,528,304 A | 6/1996 | Cherrick et al. | |
| 6,414,720 B1 | 7/2002 | Tsukidate et al. | |
| 6,924,848 B2* | 8/2005 | Onomatsu | 348/732 |
| 2002/0089603 A1 | 7/2002 | Onomatsu | |
| 2002/0101541 A1 | 8/2002 | Takagi et al. | |
| 2004/0105031 A1 | 6/2004 | Shibusawa | |
| 2004/0250292 A1 | 12/2004 | Okamoto et al. | |
| 2006/0020997 A1 | 1/2006 | Onomatsu et al. | |
| 2006/0132663 A1* | 6/2006 | Yul | 348/732 |

FOREIGN PATENT DOCUMENTS

| | | |
|---|---|---|
| JP | 2002-320158 A | 10/2002 |
| JP | 2004-188982 A | 7/2004 |
| JP | 2004-312447 A | 11/2004 |
| JP | 2004-320449 A | 11/2004 |
| JP | 2004-363910 A | 12/2004 |

OTHER PUBLICATIONS

Chinese Office Action dated Jun. 6, 2008 with English translation (Eleven (11) Pages).
Chinese Office Action dated Jun. 28, 2010 with English translation (eight (8) pages).
European Search Report dated Feb. 22, 2011 (seven (7) pages).
Japanese Office Action dated Feb. 22, 2011 with English translation (five (5) pages).

\* cited by examiner

*Primary Examiner* — Jefferey Harold
*Assistant Examiner* — Omer Khalid
(74) *Attorney, Agent, or Firm* — Crowell & Moring LLP

(57) ABSTRACT

A broadcast receiver in which a digital broadcasting and an analog broadcasting can be received includes a judgment unit for judging that the analog broadcasting is terminated when a preset condition is met and a deletion unit for carrying out a deletion process for deleting a predetermined function for the analog broadcasting when the analog broadcasting is judged as being terminated by the judgment unit, and the deletion unit executes an analog channel deletion process to delete a channel data of the analog broadcasting in a channel map and an analog display control process function deletion process to delete a display control process function for showing an indication to select the predetermined function for the analog broadcasting in a display unit.

5 Claims, 4 Drawing Sheets

FIG.2A

| CHANNEL NUMBER | FREQUENCY (MHz) | DIGITAL/ ANALOG |
|---|---|---|
| 1 | ... | ANALOG |
| 2 | ... | ANALOG |
| 3 | ... | ANALOG |
| ⋮ | ⋮ | ⋮ |
| 12 | ... | ANALOG |
| 13 | ... | DIGITAL |
| 14 | ... | DIGITAL |
| 15 | ... | DIGITAL |
| ⋮ | ⋮ | ⋮ |
| 62 | ... | DIGITAL |

FIG.2B

| CHANNEL NUMBER | FREQUENCY (MHz) | DIGITAL/ ANALOG |
|---|---|---|
| 13 | ... | DIGITAL |
| 14 | ... | DIGITAL |
| 15 | ... | DIGITAL |
| ⋮ | ⋮ | ⋮ |
| 62 | ... | DIGITAL |

BROADCAST RECEIVER

BACKGROUND OF THE INVENTION

1. Field of the Invention

The present invention relates to a broadcast receiver which can receive analog broadcasting and digital broadcasting.

2. Description of the Related Art

Digital broadcasting and analog broadcasting are mixed in terrestrial broadcasting of United States, Japan, and Europe, and the broadcast receiver which comprises functions to receive both digital broadcasting and analog broadcasting is the mainstream. However, in the future, analog broadcasting is scheduled to be terminated on a certain date set on a regional basis, and the functions for receiving analog broadcasting is not needed after the termination of analog broadcasting. This causes a problem that the operation for a user in the broadcast receiver which can receive digital broadcasting and analog broadcasting becomes complicated.

Therefore, for example, a broadcast receiving apparatus in which the number list of channels corresponding to positions and whose stations no longer exist and the number list of channels not corresponding to the positions and having stations are displayed by operating an analog CH conversion key of a remote control transmitter is disclosed in patent document 1. According to the above disclosed broadcast receiving apparatus, a user can easily carry out a channel change setting by selecting a receiving channel from the number list to search the channel to which the channel is transferred even when changes occur to the channels of terrestrial analog broadcasting accompanying the introduction of terrestrial digital broadcasting.

Further, for example, a broadcast receiving apparatus in which the first one-touch station selection key group and the second one-touch station selection key group are disposed in a remote controller, channels of terrestrial analog broadcasting are assigned to the second one-touch station selection key group, and mode switching is applied to the first one-touch station selection key group to assign channels of the terrestrial digital broadcast, a BS digital broadcast, and a 110-degree CS digital broadcast to the first one-touch station selection key group is disclosed in paten document 2. According to the above disclosed broadcast receiving apparatus, the broadcast receiving apparatus can respond to the termination of terrestrial analog broadcasting without any problem just by assigning the second one-touch station selection key group to be used for station selection of the terrestrial digital broadcasting when the terrestrial analog broadcasting is terminated.

However, in the above described broadcast receiving apparatuses disclosed in patent documents 1 and 2, a user needs to carry out some kinds of operation such as a changing operation to replace the channels of terrestrial analog broadcasting which the stations no longer exist to the channels of terrestrial digital broadcasting, an operation to assign the second one-touch station selection key group to be used for station selection of terrestrial digital broadcasting, or the like. Therefore, there is a problem that the operation becomes troublesome to the user.

Consequently, for example, a television broadcast receiving apparatus in which the change simultaneous channel table data acquired from a digital broadcast signal received by the digital broadcast receiving unit is captured in the simultaneous channel table of the flash memory to download the change simultaneous channel table data, and which performs a data updating process for updating the simultaneous channel table data stored in the simultaneous channel table of the flash memory to the change simultaneous channel table data is disclosed in patent document 3. According to the television broadcast receiving apparatus described above, when attempting to select a broadcast channel of analog broadcasting after analog broadcasting is terminated, a message is OSD displayed on a display screen of the display unit to shift to a broadcast channel of digital broadcasting which simultaneously broadcasts the same program as the broadcast channel of analog broadcasting. Therefore, the viewer can be notified that the conventional programs can be viewed on the broadcast channel of digital broadcasting even after the termination of analog broadcasting. Moreover, the channel is automatically shifted to the broadcast channel of digital broadcasting which simultaneously broadcasts the same program as the broadcast channel of analog broadcasting.

Further, for example, a terrestrial digital receiver in which the broadcasting time zone information of the broadcasting station is kept in advance, and which carries out a frequency search when the termination of broadcast wave during reception is detected in a case where the information of period for frequency change and the broadcasting time zone information of the broadcasting station which are acquired by the notice information correspond to the date on which the termination is detected to carry out the preset of the channels according to the result obtained by the frequency search is disclosed in patent document 4.

According to the above described patent document 3, the channel is automatically shifted to the channel of digital broadcasting which simultaneously broadcasts the same program as the broadcast channel of analog broadcasting after the termination of terrestrial analog broadcasting. Therefore, a trouble of a viewer changing the channel to the channel of digital broadcasting from the channel of analog broadcasting can be saved. Moreover, according to the broadcast receiving apparatus disclosed in patent document 4, the trouble of a user can be saved because the channels are automatically updated with the termination of terrestrial analog broadcasting.

[Patent Document 1] JP2004-312447
[Patent Document 2] JP2004-363910
[Patent Document 3] JP2004-320449
[Patent Document 4] JP2004-186982

However, even in the broadcast receivers disclosed in patent documents 3 and 4, there is a problem in which the operation of a user becomes complicated due to the functions for analog broadcasting remaining in the broadcast receiver. For example, in such a case where the station selecting operation becomes complicated because the channels for analog broadcasting continue to be indicated in the menu screen and the like.

SUMMARY OF THE INVENTION

The object of the present invention is to improve the operability of a user after the termination of terrestrial analog broadcasting in the broadcasting receiver which can receive digital broadcasting and analog broadcasting.

In order to solve the above problem, in accordance with a first aspect of the present invention, a broadcast receiver in which a digital broadcasting and an analog broadcasting can be received comprises a judgment unit for judging that the analog broadcasting is terminated when a preset condition is met, and a deletion unit for carrying out a deletion process for deleting a predetermined function for the analog broadcasting when the analog broadcasting is judged as being terminated by the judgment unit, and the deletion unit executes an analog channel deletion process to delete a channel data of the analog broadcasting in a channel map and an analog display control process function deletion process to delete a display control process function for showing an indication to select the predetermined function for the analog broadcasting in a display unit.

According to the first aspect of the present invention, the judgment unit judges that analog broadcasting is terminated when a preset condition is met, and the deletion unit executes a deletion process to delete predetermined functions for analog broadcasting when analog broadcasting is judged as being terminated by the judgment unit. Therefore, the functions for analog broadcasting are automatically deleted with the termination of analog broadcasting, and the operability of a user can be improved. Particularly, because the deletion unit deletes the channel data of analog broadcasting in the channel map, a user can be prevented from accidentally selecting the analog broadcasting channel and also a user can easily select the digital broadcasting channel after the termination of analog broadcasting. Thus, the operability of a user in channel selecting can be improved. Further, because the deletion unit deletes the display control process function for showing an indication to select the functions for analog broadcasting in the display unit, a user can be prevented from accidentally selecting the functions for analog broadcasting and a user can easily select the functions for digital broadcasting after the termination of analog broadcasting. Thus, the operability of a user in the display unit can be improved.

In accordance with the second aspect of the present invention, a broadcast receiver in which a digital broadcasting and an analog broadcasting can be received comprises a deletion unit for carrying out a deletion process to delete a predetermined function for the analog broadcasting.

According to the second aspect of the present invention, in a broadcast receiver which can receive digital broadcasting and analog broadcasting, because the deletion unit carries out the deletion process to delete predetermined functions for analog broadcasting, the operability of a user can be improved after the termination of terrestrial analog broadcasting.

Preferably, a judgment unit for judging that the analog broadcasting is terminated when a preset condition is met, and the deletion unit carries out the deletion process when the analog broadcasting is judged as being terminated by the judgment unit.

In the present invention, the same effect is obtained. Further, because the deletion process is executed when the judgment unit judges that analog broadcasting is terminated when a preset condition is met and the deletion unit carries out the deletion process when the analog broadcasting is judged as being terminated by the judgment unit, the functions for analog broadcasting are automatically deleted with the termination of analog broadcasting. Thus, the operability of a user can be improved.

Preferably, the deletion unit deletes a channel data of the analog broadcasting in a channel map.

In the present invention, the same effect is obtained. Further, because the deletion unit deletes the channel data of analog broadcasting in the channel map, a user can be prevented from accidentally selecting an analog broadcasting channel and a user can easily select a digital broadcasting channel after the termination of analog broadcasting. Thus, the operability of a user in channel selecting can be improved.

Preferably, the deletion unit deletes a display control process function for showing an indication to select the predetermined function for the analog broadcasting in a display unit.

In the present invention, the same effect is obtained. Further, because the deletion unit deletes the display control process function for showing an indication to select the functions for analog broadcasting in the display unit, a user can be prevented from accidentally selecting the functions for analog broadcasting in the display unit and a user can easily select the functions for digital broadcasting. Thus, the operability of a user in the display unit can be improved.

BRIEF DESCRIPTION OF THE DRAWINGS

The present invention will become fully understood from the detailed description given hereinafter and the accompanying drawings given by way of illustration only, and thus are not intended as a definition of the limits of the present invention, wherein:

FIGS. 2A and 2B are tables showing examples of a channel map which is stored in the channel map memory before the termination of analog broadcasting and after the termination of analog broadcasting.

DETAILED DESCRIPTION OF THE PREFERED EMBODIMENT

Figure 1:
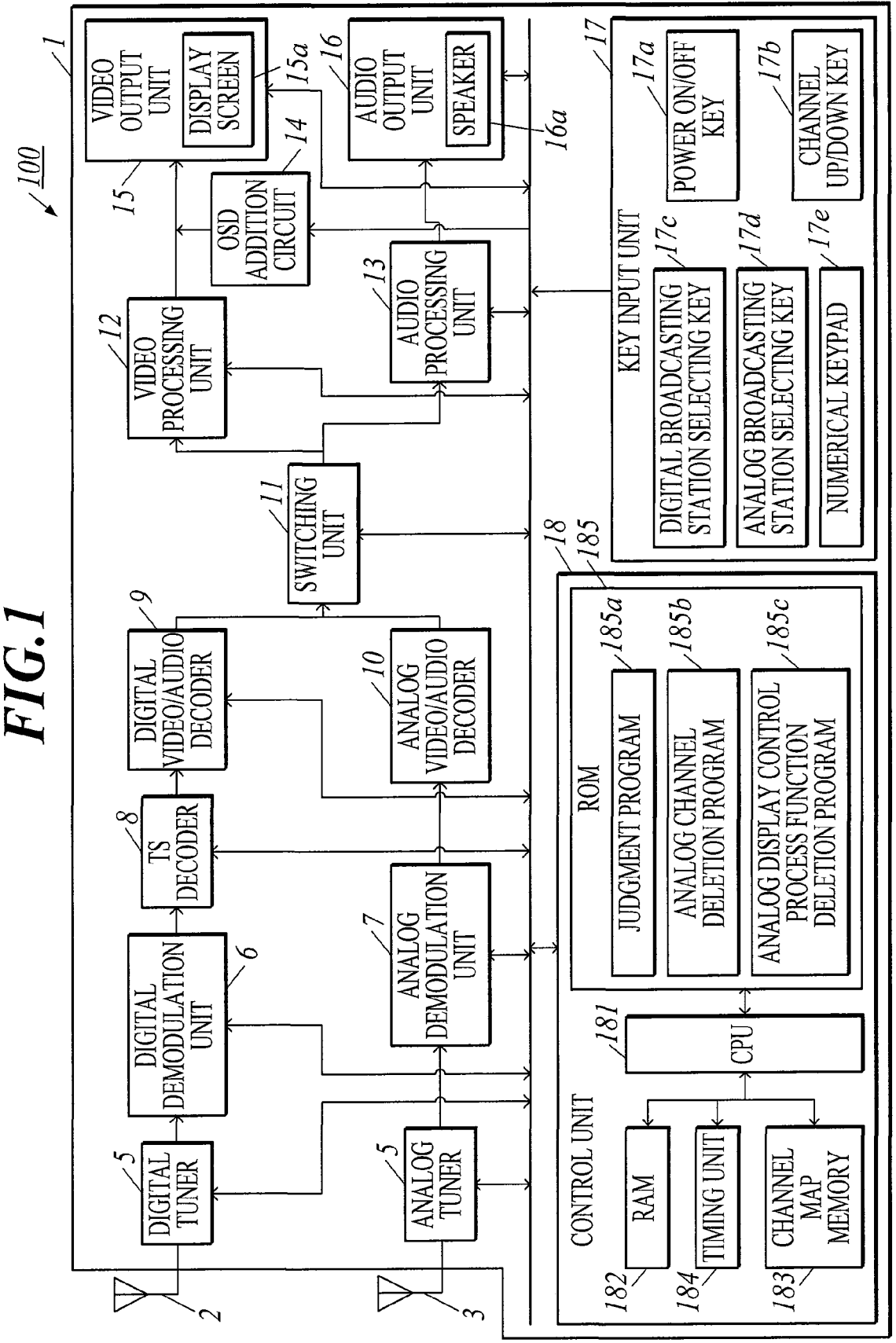
FIG. 1 is a block diagram showing a construction of a main part of a television receiver according to the present invention.

The preferred embodiment of the present invention will be described below in detail with reference to the drawings. In the embodiment, a television broadcast receiver (called television receiver, hereinafter) 100 as a broadcast receiver which can receive digital broadcasting and analog broadcasting will be described. The television receiver 100 comprises a digital receiving unit for processing the digital broadcasting signal, an analog broadcast receiving unit for processing the analog broadcasting signal, and a common unit for commonly carrying out processes for digital broadcasting and analog broadcasting. The television receiver 100 can receive both television broadcasting signals of digital broadcasting and analog broadcasting.

The television receiver 100 according to the embodiment, for example, comprises the followings in the receiver body 1; a digital antenna 2 for receiving the digital broadcasting signal, an analog antenna 3 for receiving the analog broadcasting signal, a digital tuner 4 for selecting a broadcasting signal of a predetermined channel from the digital broadcasting signal which is received by the digital antenna 2, an analog tuner 5 for selecting a broadcasting signal of a predetermined channel from the analog broadcasting signal which is received by the analog antenna 3, a digital demodulation unit 6 for demodulating the broadcasting signal which is selected by the digital tuner 4, an analog demodulation unit 7 for demodulating the broadcasting signal which is selected by the analog tuner 5, a TS decoder 8 for separating the digital broadcasting signal which is demodulated by the digital demodulation unit 6, a digital video/audio decoder 9 for decoding the digital broadcasting signal which is separated by the TS decoder 8, an analog video/audio decoder 10 for decoding the analog broadcasting signal which is demodulated by the analog demodulation unit 7, a switching unit 11 for switching the rout to an output from the digital video/audio decoder 9 or the analog video/audio decoder 10, an video processing unit 12 for carrying out a predetermined process to the video signal which is decoded by the video/audio decoder, an audio processing unit 13 for carrying out a predetermined process to the audio signal which is decoded by the video/audio decoder, an OSD addition circuit 14 for adding the OSD data to the video signal which is processed by the video processing unit 12, an video output unit 15 for outputting the video signal which is processed by the video processing unit 12, an audio output unit 16 for outputting the audio signal which is processed by the audio processing unit 13, a key input unit 17 for operating the receiver body 1 by a user transmitting various types of instructions to the receiver body 1, and a control unit 18 for integrally controlling the entire receiver body 1.

Among the above, the digital broadcast receiving unit comprises the digital antenna 2, the digital tuner 4, the digital demodulation unit 6, the TS decoder 8, the digital video/audio decoder 9, and the like. Further, the analog broadcast receiving unit comprises the analog antenna 3, the analog tuner 5, the analog demodulation unit 7, the analog video/audio decoder 10, and the like.

The digital antenna 2, for example is disposed towards a predetermined direction at outside and receives the radio frequency (RF) digital broadcasting signal (RF signal) which is transmitted from the television broadcasting station and the like (omitted from the drawing). Further, the analog antenna 3, for example, is disposed towards a predetermined direction at outside and receives the radio frequency (RF) analog broadcasting signal (RF signal) which is transmitted from the television broadcasting station and the like (omitted from the drawing).

The digital tuner 4, for example, comprises a high frequency amplification circuit and a frequency converting circuit which is consisted of a local oscillation circuit and a mixer circuit (omitted from the drawing). The digital tuner 4 amplifies the digital broadcasting signal which is input by the digital antenna 2 in the high frequency amplification circuit and mixes the digital broadcasting signal which is input by the digital antenna 2 with the local oscillation signal which is output from the local oscillation circuit in the mixer circuit. Moreover, the digital tuner 4 receives the intermediate-frequency signal (IF signal) of a particular frequency band according to the control output from the control unit 18 which is for selecting a particular frequency, and outputs the signal to the digital demodulation unit 6. Further, the analog tuner 5, for example, comprises a high frequency amplification circuit and a frequency converting circuit which is consisted of a local oscillation circuit and a mixer circuit (omitted from the drawing). The analog tuner 5 amplifies the analog broadcasting signal which is input by the analog antenna 3 in the high frequency amplification circuit and mixes the analog broadcasting signal which is input by the analog antenna 3 with the local oscillation signal which is output from the local oscillation circuit in the mixer circuit. Moreover, the analog tuner 5 receives the intermediate-frequency signal (IF signal) of a particular frequency band according to the control output from the control unit 18 which is for selecting a particular frequency and outputs the signal to the analog demodulation unit 7.

Here, the control signal regarding the selection of a channel which is input from the control unit 18 is, for example, frequency data (for example, PLL data) corresponding to the local oscillation frequency of the local oscillation signal which is output from the local oscillation circuit of the digital tuner 4 and the analog tuner 5. The channel is selected by the digital tuner 4 and the analog tuner 5 by the local oscillation circuit outputting the local oscillation signal which comprises the local oscillation frequency according to the frequency data.

The digital demodulation unit 6, for example, executes the demodulation process, the error correction process, and the like to the intermediate-frequency signal which is output from the digital tuner 4 according to the instruction from the control unit 18, and generates the transport stream (TS) to output to the TS decoder 8.

The TS decoder 8 separates the transport stream which is input from the digital demodulation unit 6 to a video stream, an audio stream, PSI/SI (Program Specific Information/Service Information), and the like which are under the standard of MPEG2 (Moving Picture Experts Group 2), and outputs the video stream and the audio stream to the digital video/audio decoder 9. In addition, the TS decoder 8 provides the data included in PSI/IS to the control unit 18.

The digital video/audio decoder 9 decodes the video stream which is input from the TS decoder 8, carries out the reverse DCT conversion, the movement compensation control, and the like, and generates a predetermined video data to output the data to the video processing unit 12 via the switching unit 11. In addition, the digital video/audio decoder 9 decodes the audio stream which is input from the TS decoder 8 and generates a predetermined audio data to output the data to the video processing unit 12 via the switching unit 11.

The analog demodulation unit 7, for example, executes the demodulation process and the like to the intermediate-frequency signal which is output from the analog tuner 5 according to the instruction from the control unit 18 and outputs the signal to the analog video/audio decoder 10.

The analog video/audio decoder 10 decodes the video signal which is input from the analog demodulation unit 7 and generates a predetermined video data to output the data to the video processing unit 12 via the switching unit 11. In addition, the analog video/audio decoder 10 decodes the audio signal which is input from the analog demodulation unit 7 and generates a predetermined audio data to output the data to the audio processing unit 13 via the switching unit 11.

The switching unit 11 switches the rout to an output from the digital video/audio decoder 9 or to an output from the analog video/audio decoder 10 according to the instruction from the control unit 18.

The video processing unit 12 performs various types of processes such as D/A conversion and the like to the video data which is input from the video decoder to generate the video signal. Further, the audio processing unit 13 performs various types of processes such as D/A conversion and the like to the audio data which is input from the audio decoder to generate the audio signal. Then, the generated video signal is output to the video output unit 15 and also the audio signal is output to the audio output unit 16.

The OSD addition circuit 14 carries out the process to combine the OSD data (omitted from the drawing) which is stored in the ROM 185 with the video signal which is output from the video processing unit 12 according to the instruction from the control unit 18.

The video output unit 15, for example, comprises a display screen (display unit) 15a such as an LCD (Liquid Crystal Display), a PDP (Plasma Display Panel), or the like, and displays the video based on the video signal which is input from the video processing unit 12 on the display screen 15a.

The audio output unit 16, for example, comprises a speaker 16a or the like, and outputs the audio based on the audio signal which is input from the audio processing unit 13 from the speaker 16a.

The key input unit 17, for example, is a remote control device (called remote, hereinafter) for remote controlling the receiver body 1, and the key input unit 17 comprising a plurality of keys. The plurality of keys provided at the key input unit 17, for example, are a power on/off key 17a, a channel up/down key 17b, a digital broadcasting station selecting key 17c, an analog broadcasting station selecting key 17d, a numerical keypad 17d, and the like. The remote control signal (called remote signal, hereinafter) corresponding to the pushed key according to the pushing operation of the key by a user is to be output.

The control unit 18 comprises a CPU (Central Processing Unit) 181, a RAM (Random Access Memory) 182, a channel map memory 183, a timing unit 184, a ROM (Read Only Memory) 185, and the like.

The CPU 181 executes various types of programs which are stored in the ROM 185 according to the input signal input from each unit of the receiver body 1 and the key input unit 17. Moreover, the CPU 181 integrally controls the overall operation of the television receiver 100 by outputting the output signal to each unit based on the program according to the programs which are executed.

The RAM 182 temporarily stores the processing results which are acquired when various types of programs are executed by the CPU 181, the input data, and the like.

The channel map memory 183, for example, comprises a nonvolatile memory such as a flash-memory, an EPROM (Erasable Programmable ROM), or the like, and provides a channel map for storing channel data of the channel which is received by the scan receive process. Particularly, the channel (physical channel) in which each broadcast signal exists and the frequency data of the each broadcast signal are classified into digital broadcasting or analog broadcasting and the channel and the frequency data are stored in the channel map memory 183 so as to refer to each other when the frequency is decided for the broadcasting signal of a channel which is selected by the digital tuner 4 and the analog tuner 5 in the scan receive process of the channel preset.

The timing unit 184, for example, times the present date in year, month, hour, minute, and second, and outputs the timed present date data to the CPU 181 according to the instruction output from the CPU 181.

The ROM 185 comprises various types of programs such as a judgment program 185a, an analog channel deletion program 185b, an analog display control process function deletion program 185c, and the like.

The judgment program 185a, for example, is a program which makes the CPU 181 realize the function to judge that analog broadcasting is terminated when the preset condition is met.

The CPU 181 functions as the judgment unit by executing the above described judgment program 185a.

Here, for example, the present date being timed by the timing unit 184 passing the end date of analog broadcasting which is decided on regional basis is an example of the preset condition. Particularly, for example, the CPU 181 judges whether the present date being timed by the timing unit 184 passed the end date of the analog broadcasting or not at a predetermined timing (for example, at the time of power activation or the like based on the pushing operation of the power on/off key 17a in the key input unit 17). When the CPU 181 judges that the present date being timed by the timing unit 184 passed the end date of analog broadcasting, the CPU 181 judges that analog broadcasting is terminated. Here, the end date of analog broadcasting which is decided on regional basis, for example, can be stored in the ROM 185 as a default value besides being included in PSI/SI to be transmitted.

Further, for example, in the TS decoder 8, the present date included in the SI (Service Information: program layout information) which is extracted from the digital broadcasting signal passing the end date of the analog broadcasting which is decided on regional basis is another example of the preset condition. Particularly, for example, when the SI is extracted in the TS decoder 8 to be output to the control unit 18, the CPU 181 extracts the present date data being stored in the SI and judges whether the present date passed the end date of analog broadcasting or not. When the CPU 181 judges that the present date stored in the SI passed the end date of analog broadcasting, the CPU 181 judges that analog broadcasting is terminated. The SI is an video/audio signal and a TS packet which is multiplexed with PSI in the transport stream as the digital broadcast signal. The present date data, for example, is included in TDT (Time and Date Table) information, TOT (Time Offset Table) information, STT (System Time Table) information, or the like.

Moreover, for example, the case in which digital broadcasting channel can be received while analog broadcasting channel cannot be received when a user continuously selects the channel which is entered in the channel map stored in the channel map memory 183 within a predetermined time span is another example of the preset condition. Particularly, for example, when a user carries out the key operation for selecting the digital broadcasting channel due to the pushing operation of the channel up/down key 17b, the digital broadcasting station selecting key 17c, the analog broadcasting station selecting key 17d, the numerical keypad 17d, and the like for more than a predetermined number of time (for example, 1 time), and further, carries out the key operation for selecting the analog broadcasting channel for more than a predetermined number of time (for example, 3 times) in the key input unit 17 within a predetermined time span (for example, within one hour), the CPU 181 judges that analog broadcasting is terminated in the case where the broadcast signal of the digital broadcasting channel can be received while the analog broadcasting channel cannot be received.

Further, for example, a predetermined analog broadcasting on/off setting item is provided in the menu and manually switching off the analog broadcasting functions is another example of the preset condition. Particularly, for example, when the analog broadcasting on/off setting item is set to be off by a user operating the key input unit 17 in the menu screen which is displayed on the display screen 15a, the CPU 181 judges that analog broadcasting is terminated.

The analog channel deletion program 185b, for example, is a program to make the CPU 181 realize the function to delete the channel data of analog broadcasting in the channel map when analog broadcasting is judged as being terminated by the execution of the judgment program 185a.

Particularly, the CPU 181 carries out the process to delete the channel data of analog broadcasting from the channel map by accessing the channel map which is stored in the channel map memory 183 when analog broadcasting is judges as being terminated by the execution of the above described judgment program 185a.

The CPU 181 functions as a deletion unit by executing the above described analog channel deletion program 185a.

Here, the analog channel deletion program 185b will be described more specifically with reference to FIGS. 2A and 2B. FIG. 2A is an example of the channel map before the termination of analog broadcasting. FIG. 2B is an example of the channel map which is updated by executing the analog channel deletion program 185b to FIG. 2A after the termination of analog broadcasting.

As shown in FIG. 2A, in the scan receive process of the channel preset, the channel in which the detected broadcast signal exists and the frequency data of broadcast signal of the channel are classified into digital broadcasting or analog broadcasting and the channels and the frequency data are stored in the channel map before the termination of analog broadcasting so as to refer to each other.

When the CPU 181 judges that analog broadcasting is terminated due to the preset condition being met by executing the judgment program 185*a*, the CPU 181 reads the channel map in FIG. 2A and deletes items of the channel which is classified as analog broadcasting. Then, as shown in FIG. 2B, only the items of digital broadcasting remain in the channel map. In such way, even when a user selects the channel of analog broadcasting by operating the channel up/down key 17*b* and the like of the key input unit 17, the channel selecting process for analog broadcasting by the analog tuner 5 cannot be executed and the analog broadcasting signal is not received.

The analog display control process function deletion program 185*c*, for example, is a program to make the CPU 181 realize the function to delete the display control process function for showing the indication to select the functions for analog broadcasting in the display screen (display unit) 15*a*.

The CPU 181 functions as the deletion unit by executing the above described analog display control process function deletion program 185*c*.

Figure 3A:
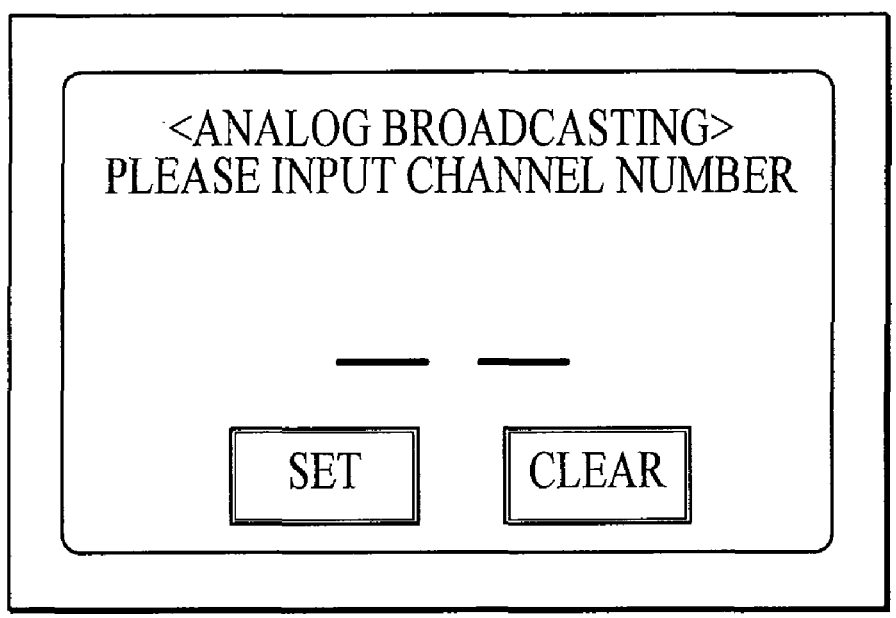
FIGS. 3A and 3B are tables showing examples of a screen which is displayed on the display screen based on the pushing operation of the analog broadcasting station selecting key before the termination of analog broadcasting and after the termination of analog broadcasting.
Figure 3B:
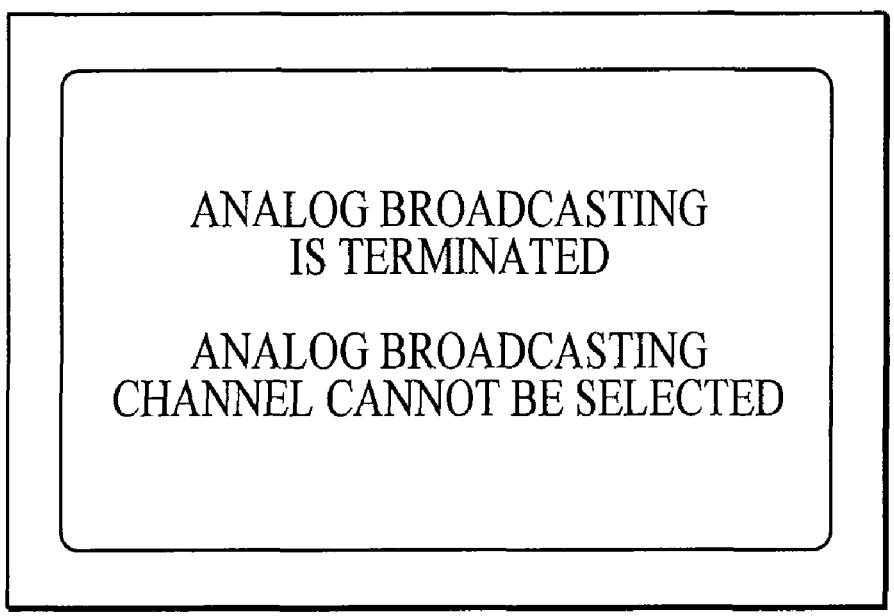

Here, for example, the display control process for showing the indication to select the station for analog broadcasting is not carried out when the analog broadcasting station selecting key 17*d* for selecting a channel of analog broadcasting is pushed by a user in the key input unit 17 of the remote and the like is an example of the deletion of the display control process deletion function for showing the indication to select the functions for analog broadcasting. For example, FIG. 3A is a screen of the display screen 15*a* when a user pushes the analog broadcasting station selecting key 17*d* before the termination of analog broadcasting, and the user inputs the analog broadcasting channel by the numerical keypad 17*d* and the like while referring to the display screen 15*a* to select the desired analog broadcasting. On the other hand, after the termination of analog broadcasting, the CPU 181 does not allow to display the screen shown in FIG. 3A even when a user pushes the analog broadcasting station selecting key 17*d*. Instead, as shown in FIG. 3B, the CPU 181 displays a notice that the stations of analog broadcasting cannot be selected to inform the termination of analog broadcasting to the user. In such way, the display control process for selecting analog broadcasting is not carried out and analog broadcasting is not received even when a user operates the analog broadcasting station selecting key 17*d* of the key input unit 17.

Figure 4:
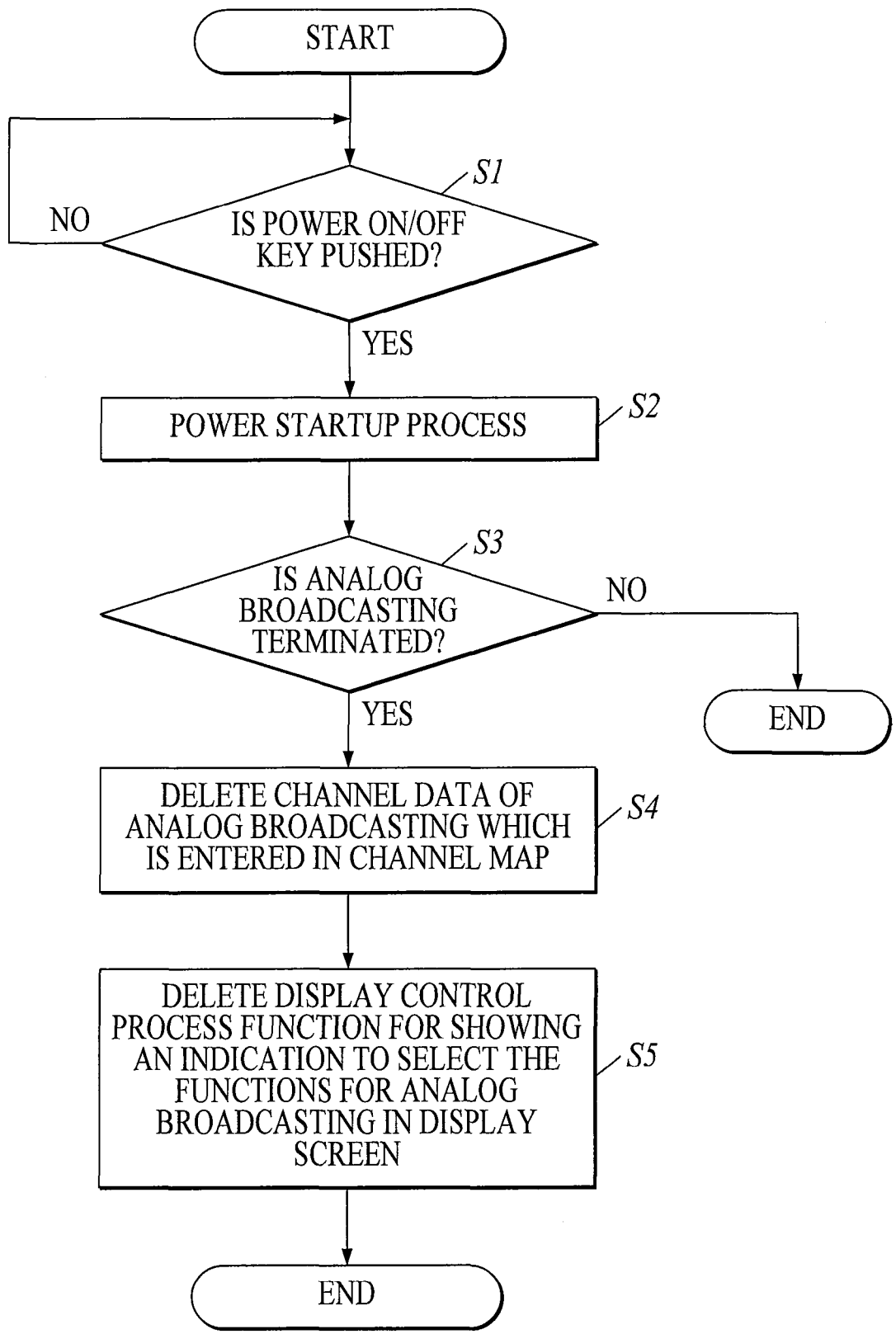
FIG. 4 is a flowchart showing a deletion process for the functions of analog broadcasting by the CPU which accompanies the termination of analog broadcasting.

Next, the deletion process of functions for analog broadcasting by the CPU 181 with the termination of analog broadcasting will be described with reference to FIG. 4.

In step S1, the CPU 181 monitors whether the key is operated or not in the key input unit 17, and judges whether the power on/off key 17*a* is operated or not. When the CPU 181 judges that the power on/off key 17*a* is operated (step S1: Yes) in step S1, the CPU 181 carries out the power startup process (step S2). Next, the CPU 181 judges whether analog broadcasting is terminated or not based on the judgment of whether the preset condition is met or not. In step S3, when the preset condition is met and the CPU 181 judges that analog broadcasting is terminated (step S3: Yes), the CPU 181 proceeds to step S4. On the other hand, when the preset condition is not met and the CPU 181 judges that analog broadcasting is not terminated (step S3; No), the process is finished. In step S4, the CPU 181 carries out the process to delete the channel data of analog broadcasting which is entered in the channel map of the channel map memory 183 from the channel map. Further, the CPU 181 carries out the process to delete the display control process function for showing an indication to select the functions for analog broadcasting in the display screen 15*a* to finish the process.

According to the above described television broadcast receiver 100 according to the present invention, in the television broadcast receiver 100 which can receive digital broadcasting and analog broadcasting, analog broadcasting is judged as being terminated when the preset condition is met by the CPU 181 executing the judgment program 185*a*. The deletion process for deleting predetermined functions for analog broadcasting is carried out by the CPU 181 executing the deletion program when analog broadcasting is judged as being terminated due to the execution of the judgment program 185*a*. Therefore, the functions for analog broadcasting are automatically deleted with the termination of analog broadcasting. Thus, the operability of a user can be improved.

Particularly, the channel data of analog broadcasting in the channel map is deleted by the CPU 181 executing the deletion program. Therefore, a user can be prevented from accidentally selecting the analog broadcasting channel and the digital broadcasting channel can be easily selected after the termination of analog broadcasting. Thus, the operability of a user in channel selecting can be improved. Further, because the display control process function for showing the indication to select the function of analog broadcasting in the display unit is deleted by the CPU 181 executing the deletion program, a user can be prevented from accidentally selecting the functions of analog broadcast and also the functions for digital broadcasting can be easily selected in the display unit after the termination of analog broadcasting. Thus, the operability of a user in the display unit can be improved.

The present invention is not limited to the above described embodiment, and can be variously modified and the design can be changed without departing from the scope of the invention.

For example, in the embodiment, the description is given for the television broadcast receiver 100 as an example of the broadcast receiver which can receive digital broadcasting and analog broadcasting. However, the broadcast receiver can be a STB (Set Top Box), a DVD (Digital Versatile Disc) recorder, or the like. Further, the preset condition is not limited to the examples shown in the above described embodiment. A case where the setting which expresses the termination of analog broadcasting is input by a user in the menu screen and the like can be a preset condition, for example.

Moreover, the display control process function for showing an indication to select the functions for analog broadcasting is not limited to the examples shown in the above described embodiment. The display control process function can be a display control process which shows an indication to instruct to start the channel preset of analog broadcasting or the like. Further, for example. an OSD data for showing an indication to select the functions for digital broadcasting and the functions for analog broadcasting in the display screen 15*a* and an OSD data for showing an indication to select the functions for digital broadcasting are stored in the ROM 185, and the CPU 181 adds an ODS data which shows an indication to select both the functions for digital broadcasting and the functions for analog broadcasting to the video signal and shows an OSD display on the display screen 15*a* until the CPU 181 judges that analog broadcasting is terminated. Then, the design can be such as when analog broadcasting is judged as being terminated due to the execution of the judgment program

185a, the CPU 181 adds an OSD data which shows the indication to select only the functions for digital broadcasting to the video signal and allows an OSD display on the display screen 15, and does not read the OSD data for showing the display which can show both functions for digital broadcasting and analog broadcasting.

The entire disclosure of Japanese Patent Application No. Tokugan 2006-085758 filed on Mar. 27, 2006 including specification, claims, drawings and summary are incorporated herein by reference in its entirety.

What is claimed is:

1. A broadcast receiver in which a digital broadcasting and an analog broadcasting can be received, comprising:
    a judgment unit for judging that the analog broadcasting has been terminated when a preset condition is met;
    a display unit; and
    a deletion unit for carrying out a deletion process for deleting a predetermined function for the analog broadcasting, wherein:
    the display unit is capable of performing a display in which a user can select a predetermined function for the analog broadcasting before the judgment unit judges that the analog broadcasting has been terminated, and p1 when the judgment unit judges that the analog broadcasting has been terminated, the deletion unit executes an analog channel deletion process to delete a channel data of the analog broadcasting in a channel map and an analog display control process function deletion process to delete a display control process function for showing an indication to select the predetermined function for the analog broadcasting in the display unit, and the display unit becomes capable of performing a display for informing that the analog broadcasting has been terminated.

2. The broadcast receiver according to claim 1, further comprising:
    a timing unit for acquiring a current time and date,
    wherein the preset condition is that the current time has passed an end date of analog broadcasting, which date is decided on a regional basis.

3. The broadcast receiver according to claim 1, further comprising:
    an extracting unit for extracting service information (SI) from a digital broadcasting signal,
    wherein the preset condition is that a current time included in the service information has passed an end date of analog broadcasting, which date is decided on a regional basis.

4. The broadcast receiver according to claim 1, further comprising:
    an input unit for receiving a selection of a channel,
    wherein the preset condition is that an analog broadcasting channel cannot be received when the analog broadcasting channel is selected in the selection receiving unit for a predetermined number of times or more.

5. The broadcast receiver according to claim 1, further comprising:
    an input unit for receiving an ON/OFF setting of analog broadcasting,
    wherein the preset condition is that the analog broadcasting is set to OFF in the ON/OFF setting receiving unit.

* * * * *